(12) United States Patent
Sato et al.

(10) Patent No.: US 8,958,454 B2
(45) Date of Patent: Feb. 17, 2015

(54) MIRROR ADJUSTMENT METHOD AND MIRROR ADJUSTING SYSTEM ADJUSTING SLANTS OF MIRRORS PROVIDED AT LASER OSCILLATOR

(71) Applicant: FANUC Corporation, Minamitsuru-Gun, Yamanashi (JP)

(72) Inventors: Takanori Sato, Yamanashi (JP); Takafumi Murakami, Yamanashi (JP)

(73) Assignee: Fanuc Corporation, Minamitsuru-Gun, Yamanashi (JP)

( * ) Notice: Subject to any disclaimer, the term of this patent is extended or adjusted under 35 U.S.C. 154(b) by 0 days.

(21) Appl. No.: 14/164,968

(22) Filed: Jan. 27, 2014

(65) Prior Publication Data
US 2014/0211825 A1 Jul. 31, 2014

(30) Foreign Application Priority Data
Jan. 31, 2013 (JP) .................................. 2013-016595

(51) Int. Cl.
*H01S 3/08* (2006.01)
*H01S 3/086* (2006.01)

(52) U.S. Cl.
CPC ...................................... *H01S 3/086* (2013.01)
USPC .................. 372/107; 372/93; 372/98; 372/99

(58) Field of Classification Search
CPC ........................................................ H01S 3/086
See application file for complete search history.

(56) References Cited

U.S. PATENT DOCUMENTS

| 4,939,739 | A  | * | 7/1990  | Hobart et al. ................. 372/107 |
| 5,033,061 | A  | * | 7/1991  | Hobart et al. ................. 372/107 |
| 5,121,405 | A  | * | 6/1992  | Negus ........................... 372/107 |
| 5,200,965 | A  |   | 4/1993  | Okuyama et al. |
| 6,377,601 | B1 | * | 4/2002  | Aoki ............................. 372/107 |
| 6,813,287 | B2 | * | 11/2004 | Bushida et al. ................ 372/20 |
| 7,501,602 | B2 | * | 3/2009  | Yamazaki et al. ....... 219/121.74 |

FOREIGN PATENT DOCUMENTS

| JP | 01-186687    | 7/1989  |
| JP | 04-184988    | 7/1992  |
| JP | 04-356982    | 12/1992 |
| JP | A 5-37050    | 2/1993  |
| JP | 11-220193    | 8/1999  |
| JP | 2000-151005  | 5/2000  |

OTHER PUBLICATIONS

Japanese Office Action for 2013-016595 mailed Jun. 24, 2014.

* cited by examiner

*Primary Examiner* — Yuanda Zhang
(74) *Attorney, Agent, or Firm* — RatnerPrestia

(57) ABSTRACT

The slant of a first mirror (21), the slant of a second mirror (22), and the laser output when the slant of the first mirror (21) is an initial value and when the slant of the first mirror (21) is made to move from the initial value by exactly a predetermined value in the positive and negative directions are used as the basis to calculate a first approximation curve of the laser output with respect to the slant of the first mirror (21) and second approximation curve of the laser output with respect to the slant of the second mirror (22), set a value which corresponds to a local maximum value of the first approximation curve as the slant of the first mirror (21), and set a value which corresponds to a local maximum value of the second approximation curve as the slant of the second mirror (21).

12 Claims, 9 Drawing Sheets

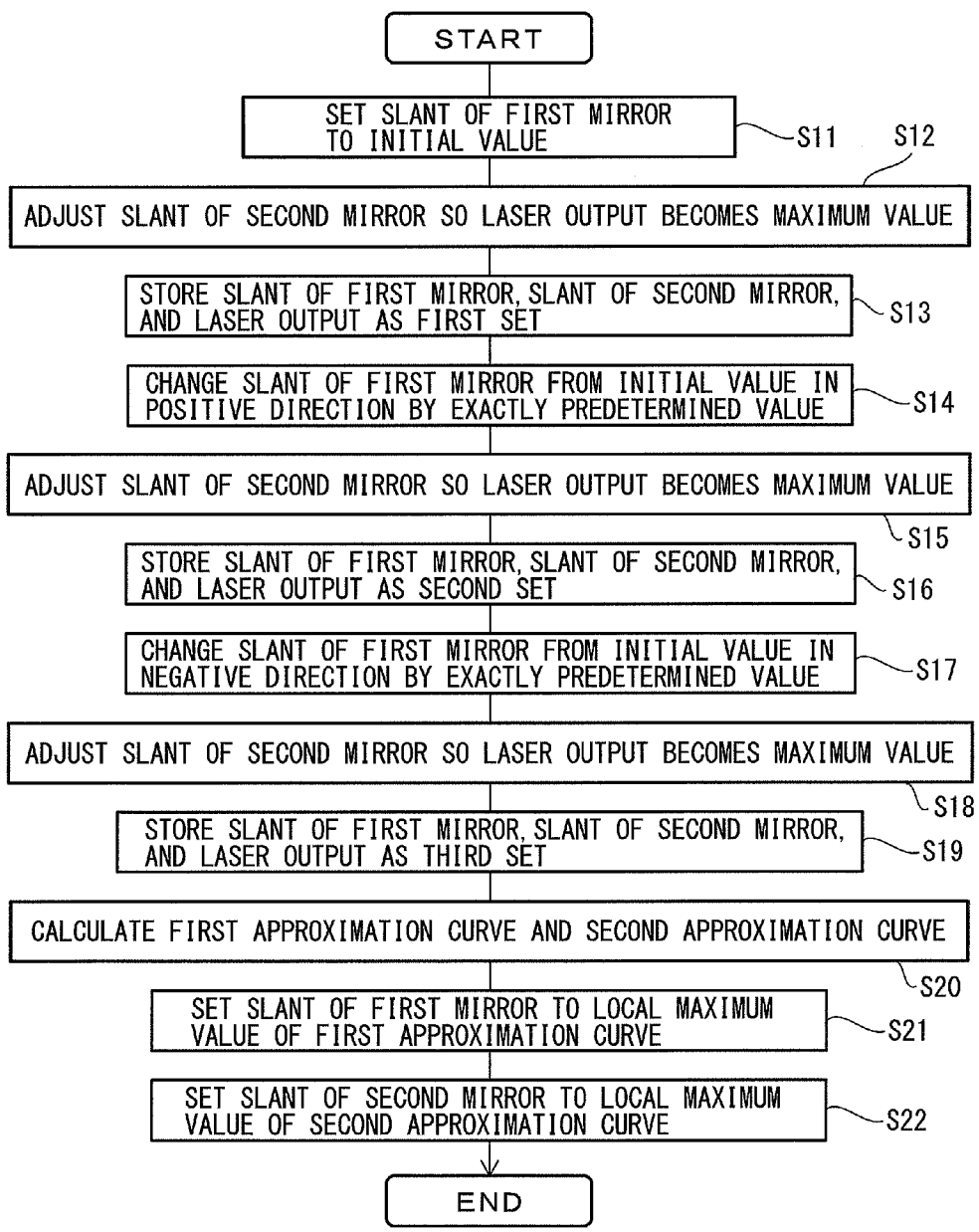

MIRROR ADJUSTMENT METHOD AND MIRROR ADJUSTING SYSTEM ADJUSTING SLANTS OF MIRRORS PROVIDED AT LASER OSCILLATOR

BACKGROUND OF THE INVENTION

1. Technical Field

The present invention relates to a mirror adjustment method which adjusts the slants of at least two mirrors which are provided in a high output laser oscillator which is used for cutting, welding, and otherwise working a workpiece and a mirror adjustment system which performs such a method.

2. Description of the Related Art

In general, the output of a laser oscillator falls due to fouling and degradation of the inside mirrors which are provided at a resonator of a laser oscillator. For this reason, the inside mirrors have to be periodically detached from the resonator to be washed or replaced. Further, the inside mirrors are reattached to the resonator, then the inside mirrors are adjusted in slants to adjust the optical axis of the resonator.

The optical axis of the resonator of a conventional laser oscillator is adjusted in the following way. First, two mirrors are selected from the plurality of inside mirrors of the resonator. Note that, it is assumed that these inside mirrors are attached to a stage which is provided with two adjusting parts which make the inside mirrors slant in two perpendicularly intersecting directions.

FIG. 11 is a view which shows the relationship between the slant of a first mirror among the two mirrors and the laser output in the prior art. An adjusting part of the first mirror is used to set the slant of the first mirror to a certain value in one direction among two perpendicularly intersecting directions and an adjusting part of a second mirror is adjusted in the same direction so that the laser output becomes a maximum value. Such an operation is performed a plurality of times so as to obtain a relationship M between the slant of the first mirror and the maximum value of the laser output at that time which is shown in FIG. 11. The relationship M which is shown in FIG. 11 is asymmetric at the left and right. The reason is that when there are a large number of inside mirrors of the resonator, there are inside mirrors which remain unadjusted and these affect the relationship M.

In FIG. 11, a point M0 is the maximum value of the laser output as a whole. Further, a line parallel to the abscissa is drawn at a location smaller than the value of the point M0 by exactly a predetermined ratio. This predetermined ratio is, for example, 10% to 30%. Then, the two intersecting points of this line and relationship M are set as M1 and M2. Then, the adjusting part of the first mirror is used to set a center point MC which is shown by the arrow between the intersecting points M1 and M2 as the slant of the first mirror. In this case, the passing area through which the laser light passes between the two mirrors which are adjusted becomes the largest.

Further, the adjusting part of the second mirror is used to adjust the slant of the second mirror so that the maximum value of the laser output is obtained. After this, a similar operation is performed in another direction as well. Furthermore, when the number of inside mirrors of the resonator is large, other inside mirrors are combined and successively adjusted. By this, it is possible to increase the passing area of passage through the discharge tube as a whole to obtain laser light with less interference and less output loss.

Japanese Patent Publication No. 5-37050A similarly discloses to successively make one inside mirror among a pair of inside mirrors slant while adjusting the other inside mirror so that the laser output becomes a maximum value.

FIG. 12 is another view which shows the relationship between the slant of the first mirror and the laser output in the prior art. In FIG. 12, first, the slant of the first mirror is adjusted from the line L1 which is parallel to the ordinate to the right direction, but the maximum value of the laser output is not obtained so the slant of the first mirror is adjusted from the line L1 to the left direction. In such a case, the number of adjustment operations increases and as a result there is the problem that the work time becomes longer. In particular, when the peak part in the relationship M is relatively flat, the number of adjustment operations has to be increased and similarly the work time becomes extremely long.

Further, in the configuration of Japanese Patent Publication No. 5-37050A, at each detection point, the amount of change with respect to the average value of the laser output at the previous detection point is used as the basis to adjust the inside mirrors. By performing such processing, the number of adjustment operations until convergence becomes extremely great and shortening the work time is difficult. Furthermore, when the peak part is relatively flat, the work time becomes extremely long.

The present invention was made in consideration of such a situation and has as its object the provision of a mirror adjusting method which enables the work time to be greatly shortened and a mirror adjusting system which performs such a method.

SUMMARY OF THE INVENTION

To achieve the above-mentioned object, according to a first aspect, there is provided a mirror adjustment method which adjusts slants of a first mirror and second mirror in a mirror adjusting system, comprising a laser oscillator which includes at least the first mirror and the second mirror, a laser output measuring part which measures a laser output from the laser oscillator, a first adjusting part which adjusts the slant of the first mirror, and a second adjusting part which adjusts the slant of the second mirror, which mirror adjustment method comprising steps of: in a state where, the first adjusting part sets the slant of the first mirror to an initial value, storing a slant of the second mirror which is adjusted by the second adjusting part so that a laser output which is measured by the laser output measuring part becomes a maximum value, the slant of the first mirror, and the maximum value of the laser output as a first set, in a state where the first adjusting part changes the slant of the first mirror from the initial value in a positive direction by exactly a predetermined value, storing the slant of the second mirror which is adjusted by the second adjusting part so that the laser output which is measured by the laser output measuring part becomes a maximum value, the slant of the first mirror, and the maximum value of the laser output as a second set, in a state where the first adjusting part changes the slant of the first mirror from the initial value in a negative direction by exactly a predetermined value, storing the slant of the second mirror which is adjusted by the second adjusting part so that the laser output which is measured by the laser output measuring part becomes a maximum value, the slant of the first mirror, and the maximum value of the laser output as a third set, calculating a first approximation curve of the laser output with respect to the slant of the first mirror and a second approximation curve of the laser output with respect to the slant of the second mirror, based on the first set, the second set, and the third set, setting the slant of the first mirror to a value which corresponds to a local maximum value of the first approximation curve, by the first adjusting part, and setting the slant of the second mirror to a value which corresponds to a local maximum value of the second approximation curve by the second adjusting part.

According to a second aspect, there is provided the first aspect wherein the first approximation curve and the second approximation curve are secondary functions.

According to a third aspect, there is provided a mirror adjustment method which adjusts slants of a first mirror and second mirror in a mirror adjusting system comprising a laser oscillator which includes at least the first mirror and the second mirror, a laser output measuring part which measures a laser output from the laser oscillator, a first adjusting part which adjusts the slant of the first mirror, and a second adjusting part which adjusts the slant of the second mirror, which mirror adjustment method comprising steps of: in a state where the first adjusting part sets the slant of the first mirror to an initial value, storing a slant of the first at the time when the second adjusting part adjusts a slant of the second mirror so that a laser output which is measured by the laser output measuring part becomes a maximum value and the maximum value of the laser output as a first set, in a state where the first adjusting part changes the slant of the first mirror from the initial value in a positive direction by exactly a predetermined value, storing the slant of the first mirror at the time when the second adjusting part adjusts a slant of the second mirror so that a laser output which is measured by the laser output measuring part becomes a maximum value and the maximum value of the laser output as a second set, in a state where the first adjusting part changes the slant of the first mirror from the initial value in a negative direction by exactly a predetermined value, storing the slant of the first mirror at the time when the second adjusting part adjusts a slant of the second mirror so that a laser output which is measured by the laser output measuring part becomes a maximum value and the maximum value of the laser output as a third set, calculating an approximation curve of the laser output with respect to the slant of the first mirror, based on the first set, the second set, and the third set setting the slant of the first mirror to a value which corresponds to a local maximum value of the first approximation curve, by the first adjusting part, and adjusting a slant of the second mirror so that a laser output which is measured by the laser output measuring part becomes a maximum value by the second adjusting part.

According to a fourth aspect, there is provided the third aspect wherein the approximation curve is a secondary function.

According to a fifth aspect, there is provided a mirror adjusting system, comprising a laser oscillator which includes at least a first mirror and a second mirror, a laser output measuring part which measures a laser output from the laser oscillator, a first adjusting part which adjusts the slant of the first mirror, a second adjusting part which adjusts the slant of the second mirror, and a memory part which stores the laser output which was measured by the laser output measuring part, a slant of the first mirror which was adjusted by the first adjusting part, and a slant of the second mirror which was adjusted by the second adjusting part linked together, wherein, in a state where the first adjusting part sets the slant of the first mirror to an initial value, the memory part stores a slant of the second mirror which is adjusted by the second adjusting part so that a laser output which is measured by the laser output measuring part becomes a maximum value, the slant of the first mirror, and the maximum value of the laser output as a first set, wherein, in a state where the first adjusting part changes the slant of the first mirror from the initial value in a positive direction by exactly a predetermined value, the memory part stores the slant of the second mirror which is adjusted by the second adjusting part so that the laser output which is measured by the laser output measuring part becomes a maximum value, the slant of the first mirror, and the maximum value of the laser output as a second set, wherein, in a state where the first adjusting part changes the slant of the first mirror from the initial value in a negative direction by exactly a predetermined value, the memory part stores the slant of the second mirror which is adjusted by the second adjusting part so that the laser output which is measured by the laser output measuring part becomes a maximum value, the slant of the first mirror, and the maximum value of the laser output as a third set, the mirror adjusting system further comprising: a calculating part which calculates a first approximation curve of the laser output with respect to the slant of the first mirror and a second approximation curve of the laser output with respect to the slant of the second mirror, based on the first set, the second set, and the third set, and wherein the first adjusting part sets the slant of the first mirror to a value which corresponds to a local maximum value of the first approximation curve, and the second adjusting part sets the slant of the second mirror to a value which corresponds to a local maximum value of the second approximation curve.

According to a sixth aspect, there is provided the fifth aspect wherein the first approximation curve and the second approximation curve are secondary functions.

According to a seventh aspect, there is provided a mirror adjusting system, comprising a laser oscillator which includes at least a first mirror and a second mirror, a laser output measuring part which measures a laser output from the laser oscillator, a first adjusting part which adjusts the slant of the first mirror, a second adjusting part which adjusts the slant of the second mirror, and a memory part which stores the laser output which was measured by the laser output measuring part, a slant of the first mirror which was adjusted by the first adjusting part, and a slant of the second mirror which was adjusted by the second adjusting part linked together, wherein, in a state where the first adjusting part sets the slant of the first mirror to an initial value, the memory part stores a slant of the first at the time when the second adjusting part adjusts a slant of the second mirror so that a laser output which is measured by the laser output measuring part becomes a maximum value and the maximum value of the laser output as a first set, wherein, in a state where the first adjusting part changes the slant of the first mirror from the initial value in a positive direction by exactly a predetermined value, the memory part stores the slant of the first mirror at the time when the second adjusting part adjusts a slant of the second mirror so that a laser output which is measured by the laser output measuring part becomes a maximum value and the maximum value of the laser output as a second set, wherein, in a state where the first adjusting part changes the slant of the first mirror from the initial value in a negative direction by exactly a predetermined value, the memory part stores the slant of the first mirror at the time when the second adjusting part adjusts a slant of the second mirror so that a laser output which is measured by the laser output measuring part becomes a maximum value and the maximum value of the laser output as a third set, the mirror adjusting system further comprising: a calculating part which calculates a first approximation curve of the laser output with respect to the slant of the first mirror, based on the first set, the second set, and the third set, and wherein the first adjusting part sets the slant of the first mirror to a value which corresponds to a local maximum value of the first approximation curve, and the second adjusting part sets the slant of the second mirror to a value which corresponds to a local maximum value of the second approximation curve.

According to an eighth aspect, there is provided the seventh aspect wherein the approximation curve is a secondary function.

According to a ninth aspect, there is provided a laser oscillator which is adjusted in slants of the first mirror and the second mirror by the mirror adjustment method according to the first aspect.

According to a 10th aspect, there is provided a laser oscillator which is adjusted in slants of the first mirror and the second mirror by the mirror adjustment method according to the third aspect.

According to an 11th aspect, there is provided a laser oscillator which is provided with a mirror adjusting system of the fifth aspect.

According to a 12th aspect, there is provided a laser oscillator which is provided with a mirror adjusting system of the seventh aspect.

These and other objects, features, and advantages of the present invention will become clearer from the detailed description of typical embodiments of the present invention which are shown in the attached drawings.

BRIEF DESCRIPTION OF THE DRAWINGS

FIG. 4 is a flow chart which explains a mirror adjustment method according to a first embodiment of the present invention.

DETAILED DESCRIPTION

Below, embodiments of the present invention will be explained with reference to the attached drawings. In the following figures, similar members are assigned similar reference notations. To facilitate understanding, these figures are suitably changed in scale.

Figure 1:
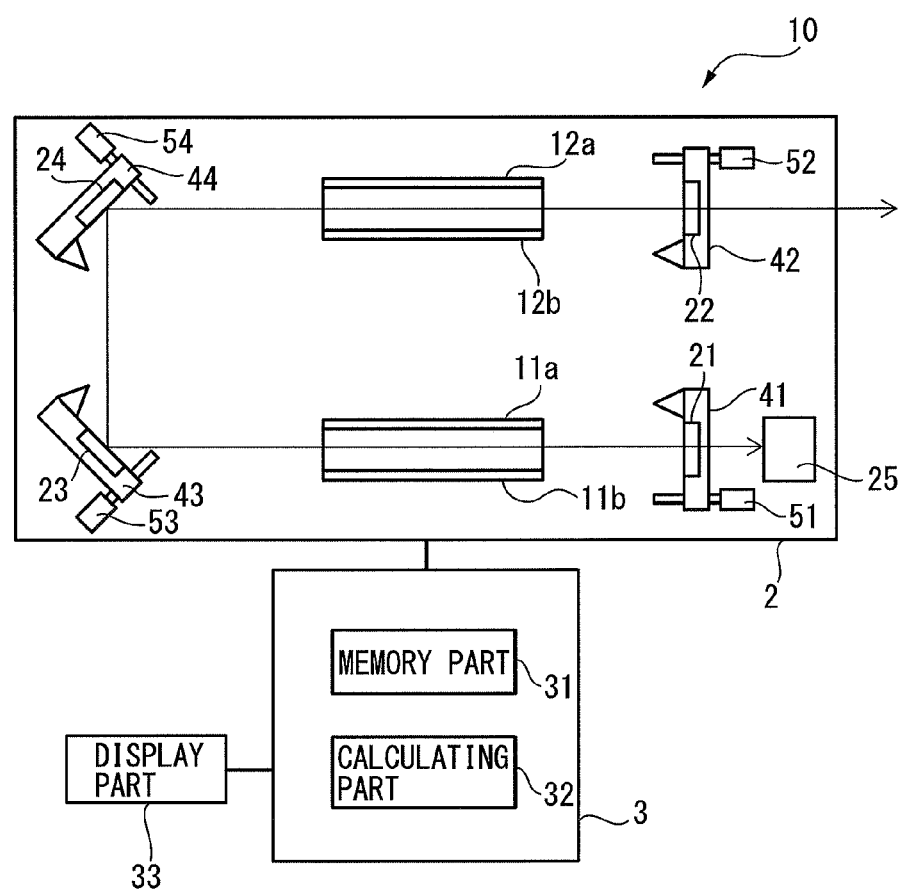
FIG. 1 is a block diagram of a mirror adjusting system according to the present invention.

FIG. 1 is a block diagram of a mirror adjusting system according to the present invention. The mirror adjusting system 10 according to the present invention includes a laser oscillator 2 and a control device 3. The laser oscillator 2 is a discharge excitation type which outputs a relatively high output laser. This laser oscillator 2 has a rear mirror (RM) 21 and output coupler (OC) 22 which both have partial transmittances. Behind the rear mirror 21, a laser power sensor 25 is arranged.

The laser light which is taken out from the rear mirror 21 is detected by the laser power sensor 25. That laser output is input to a memory part 31 of the control device 3.

As shown in FIG. 1, at the light path between the rear mirror 21 and output coupler 22, two sets of discharge tube walls 11a, 11b and 12a, 12b are arranged. These discharge tube walls 11a, 11b and 12a, 12b are arranged in series with each other and form resonant spaces. Furthermore, an excitation medium is arranged between these discharge tube walls 11a, 11b and 12a, 12b.

Further, in the light path between the rear mirror 21 and output coupler 22, a first folding mirror (FM1) 24 and a second folding mirror 23 (FM2) are arranged. These folding mirrors 23, 24 are full reflection mirrors. The laser light which passes through the discharge tube walls 11a, 11b is rotated 180 degrees and made to enter the discharge tube walls 12a, 12b by the folding mirrors 23, 24. Below, the rear mirror 21, output coupler 22, and folding mirrors 23, 24 will sometimes suitably be called the "inside mirrors".

The control device 3 is a digital computer and controls the operation of the laser oscillator 2 as a whole. As shown in the figure, the control device 3 includes the memory part 31 which stores the laser output which is measured by the laser power sensor 25 linked with the slants of the two inside mirrors. Further, the control device 3 performs the function as a calculating part 32 which uses the various values which are stored in the memory part 31 to calculate later explained approximation curves. Furthermore, the control device 3 has a display part 33, for example, a liquid crystal display, connected to it.

When the laser oscillator 2 is started up, a laser beam is output from the output coupler 22 of the laser oscillator 2 and is supplied to a not shown laser working machine. In the laser working machine, the laser beam cuts, welds, or otherwise works a not shown workpiece.

Figure 2:
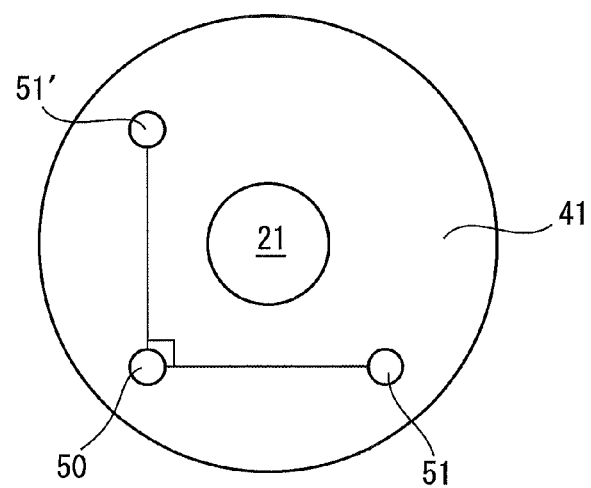
FIG. 2 is a top view of a stage which is provided with a rear mirror.
Figure 3:
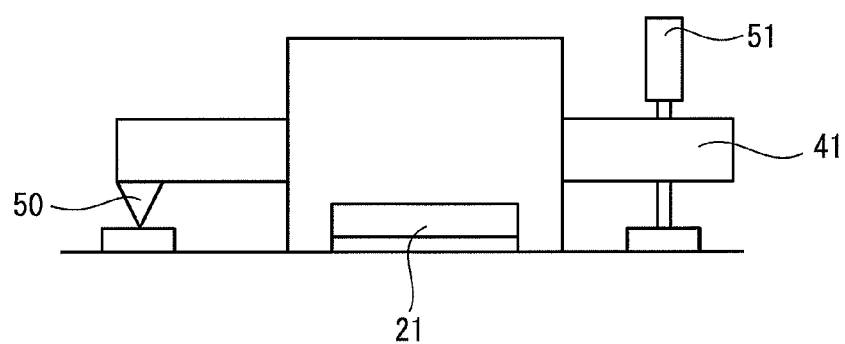
FIG. 3 is a cross-sectional view of the stage which is shown in FIG. 2.

FIG. 2 is a top view of a stage which is provided with a rear mirror, while FIG. 3 is a cross-sectional view of the stage which is shown in FIG. 2. As shown in these figures, at the center of the stage 41, a rear mirror 21 is fastened so as to become parallel with an end face of the stage 41. Further, at the end face of the stage 41, a first adjusting part 51 and a second adjusting part 51' are arranged.

As shown in FIG. 3, at the other end face of the stage 41, a projecting type support point 50 is arranged. Its front end contacts the fastening part. As will be understood by referring again to FIG. 2, the line segment which connects the support point 50 and first adjusting part 51 is vertical to the line segment which connects the support point 50 and the second adjusting part 51'.

The first adjusting part 51 is a device which includes a micrometer mechanism which enables adjustment of the slant of the stage 41 by being turned. In this regard, the first adjusting part 51 and the second adjusting part 51' are configured similar to each other, but note that the first adjusting part 51 adjusts the slant of the stage 41 in the vertical direction, while the second adjusting part 51' adjusts the slant of the stage 41 in the horizontal direction.

Note that, the read values of the first adjusting part 51 and the second adjusting part 51' do not match the slant of the stage 41. The slant of the stage 41 is determined from the read values of the first adjusting part 51 and second adjusting part 51'. Further, as shown in FIG. 1, the stage 43 of the second folding mirror 23 is provided with a first adjusting part 53 and a second adjusting part 53', while the stage 44 of the first folding mirror 24 is provided with a first adjusting part 54 and a second adjusting part 54'. The stages 43, 44 and adjusting parts 53, 53', 54 and 54' of these other inside mirrors are generally configured in the same way, so additional explanations will be omitted.

Figure 5A:
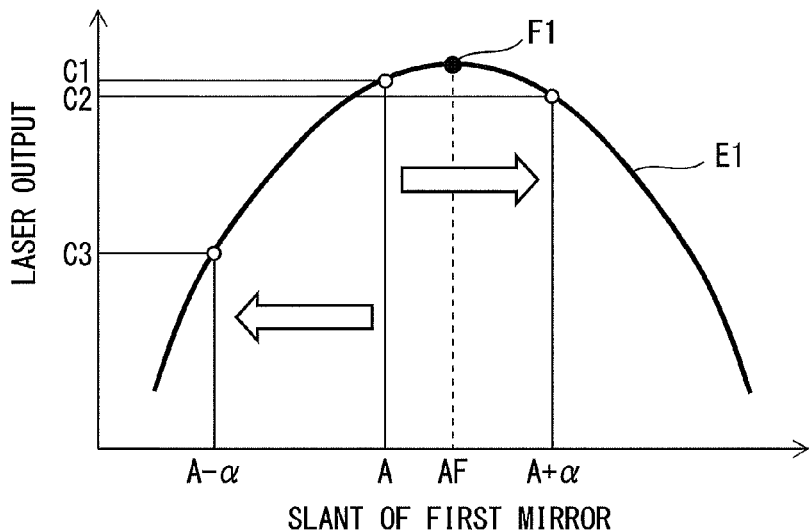
FIG. 5A is a view which shows the relationship between a slant of a first mirror and a laser output.
Figure 5B:
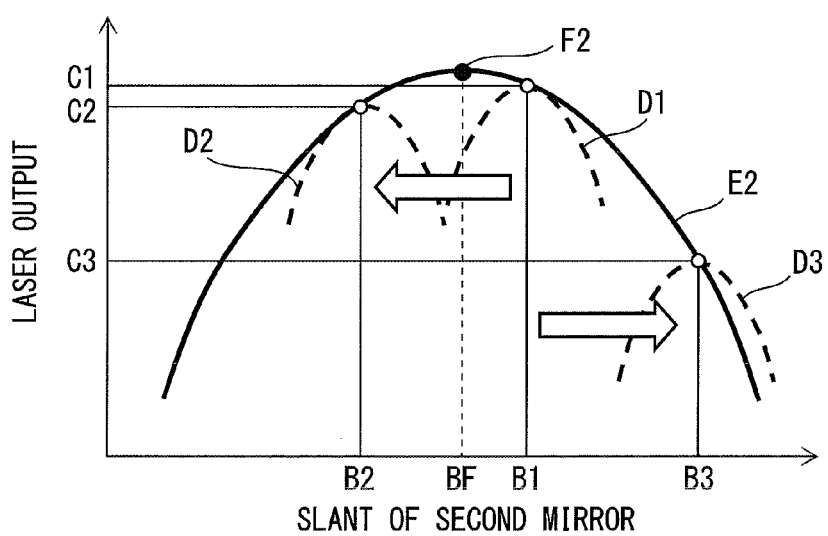
FIG. 5B is a view which shows the relationship between a slant of a second mirror and a laser output.

FIG. 4 is a flow chart which explains a mirror adjustment method according to the first embodiment of the present invention. Further, FIG. 5A and FIG. 5B are views which show relationships between the slants of the first mirror and second mirror and the laser output. In the following explanation, the rear mirror 21 will be referred to as the "first mirror" and the output coupler 22 will be referred to as the "second mirror". Furthermore, assume the first adjusting part 41 in one direction of one stage 41 and the first adjusting part 52 in the same direction of another stage 42 are used. Below, referring to these figures, a mirror adjustment method according to the first embodiment will be explained. Further, such an mirror adjustment method is performed after attaching the inside mirrors to the resonator.

First, at step S11 of FIG. 4, the first adjusting part 51 of the stage 41 is used to set the slant of the first mirror 21 at a predetermined initial value A (see FIG. 5A). Then, as shown in FIG. 5B by the broken line D1, the first adjusting part 52 of stage 42 is used to adjust the slant of the second mirror 22. Further, the slant B1 of the second mirror 22 is set so that the laser output which is measured by the laser power sensor 25 becomes the maximum value C1 (step S12).

Figure 6:
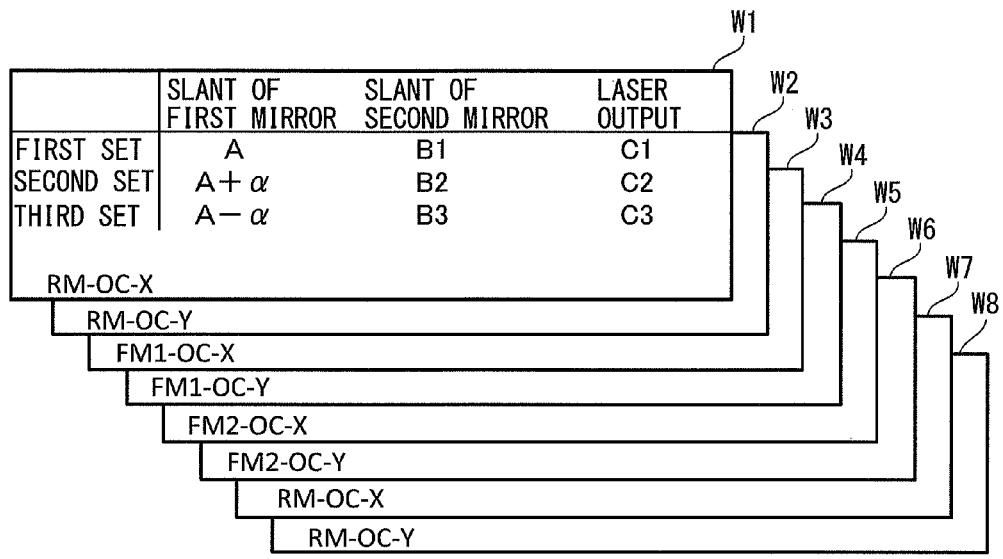
FIG. 6 is a view which shows a display screen of a display part.

Then, at step S13, the slant of the first mirror 21 (initial value A) and the slant B1 of the second mirror when the laser output becomes the maximum value C1 are stored together with the maximum value C1 of the laser output as a first set in the memory part 31. In this regard, FIG. 6 is a view which shows the display screen of a display part 33. The stored content of the memory part 31 is displayed on the display part 33. As shown in FIG. 6, the slant of the first mirror 21 (initial value A), the slant B1 of the second mirror, and the laser output C1 are stored as a first set linked together at the topmost window W1. Note that, the topmost window W1 is used at the time of adjustment in the X-axial direction for the rear mirror 21 (RM) and second mirror 22 (OM).

Then, at step S14, the first adjusting part 51 is operated. Due to this, the slant of the first mirror 21 is made to change from the initial value A by exactly a predetermined value α in the positive direction (see FIG. 5A). Then, as shown in FIG. 5B by the broken line D2, the first adjusting part 52 of the stage 42 is used to adjust the slant of the second mirror 22. Further, the slant B2 of the second mirror 22 is set so that the laser output which is measured by the laser power sensor 25 becomes the maximum value C2 (step S15). Furthermore, as shown in FIG. 6, the slant of the first mirror 21 (initial value A+α) and the slant B2 of the second mirror when the laser output becomes the maximum value C2 are stored together with the maximum value C2 of the laser output as a second set linked together in the memory part 31 (step S16).

Then, at step S17, the first adjusting part 51 is operated whereby the slant of the first mirror 21 is made to change from the initial value A by exactly a predetermined value α in the negative direction (see FIG. 5A). Then, as shown in FIG. 5B by the broken line D3, the first adjusting part 52 of the stage 42 is used to adjust the slant of the second mirror 22. Further, the slant B3 of the second mirror 22 is set so that the laser output which is measured by the laser power sensor 25 becomes the maximum value C3 (step S18). Furthermore, as shown in FIG. 6, the slant of the first mirror 21 (initial value A−α) and the slant B3 of the second mirror when the laser output becomes the maximum value C3 are stored together with the maximum value C3 of the laser output as a third set linked together in the memory part 31 (step S19).

After that, the routine proceeds to step S20 where the calculating part 32 of the control device 3 uses, the data of the slant of the first mirror 21 and the laser output among the first set, second set, and third set, to calculate the first approximation curve E1 of the laser output with respect to the slant of the first mirror 21 (see FIG. 5A). Furthermore, the calculating part 32 uses the data of the slant of the second mirror 22 and the laser output among the first set, second set, and third set to calculate a second approximation curve E2 of the laser output with respect to the slant of the second mirror 22 (see FIG. 5B).

As shown in FIG. 5A and FIG. 5B, the first approximation curve E1 and second approximation curve E2 are upwardly projecting secondary functions. Due to this, it is possible to easily find the local maximum values F1 and F2 of the first approximation curve E1 and the second approximation curve E2. However, it is also possible to employ other types of approximation curves, for example, hyperbolas, to find the local maximum values.

Then, at step S21, the first adjusting part 51 is used to set the slant of the first mirror 21 to a value AF which corresponds to the local maximum value F1 of the first approximation curve E1. Furthermore, at step S22, the first adjusting part 52 is used to set the slant of the second mirror 22 to a value BF which corresponds to the local maximum value F2 of the second approximation curve E2. That is, in the present invention, instead of the center point MC which was explained in the section on the prior art, a local maximum values are employed.

In this way, the first adjusting part 51 of the stage 41 which is provided with the first mirror 21 and the first adjusting part 52 of the stage 42 which is provided with the second mirror 22 are used for adjustment in the X-axial direction. This adjustment operation corresponds to step S51 of FIG. 7 which shows the procedure of the mirror adjustment action. Further, when the processing of step S22 in FIG. 4 ends, the routine proceeds to step S52 of FIG. 7 where the second adjusting part 51' of the stage 41 and the second adjusting part 52' of the stage 42 are used for adjustment in the Y-axial direction in the same way as explained with reference to FIG. 4. In this case, the second window W2 which is shown in FIG. 6 is used. When the laser oscillator 2 is not provided with inside mirrors other than the rear mirror 21 and output coupler 22, the processing is ended at step S52.

When the laser oscillator 2 includes the folding mirrors 23, 24, the routine further proceeds to step S53 on. Further, at step S53 and step S54, the first folding mirror 24 and output coupler 22 are similarly adjusted in the X-axial direction and the Y-axial direction. Furthermore, at step S55 and step S56, the second folding mirror 23 and output coupler 22 are respectively adjusted in the X-axial direction and the Y-axial direction. Furthermore, at step S57 and step S58, the rear mirror 21 and output coupler 22 are respectively similarly again adjusted in the X-axial direction and the Y-axial direction.

In such a case, the third to eighth windows W3 to W8 which are shown in FIG. 6 are suitably used. Further, it will be clear that the first mirror and second mirror in FIG. 4 are suitably replaced with any of the rear mirror 21, output coupler 22, and folding mirrors 23, 24.

Figure 7:
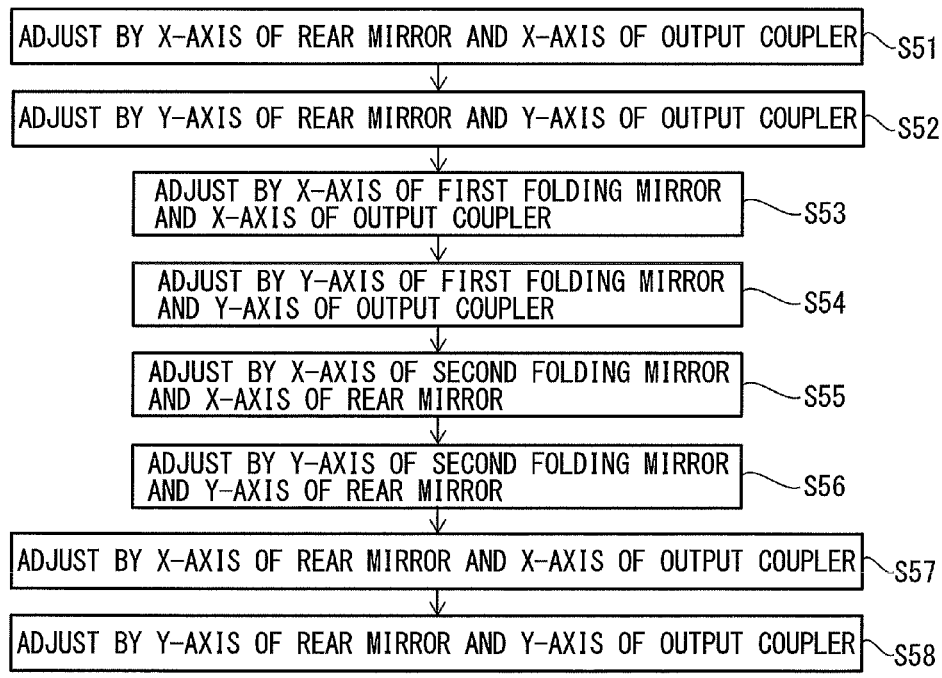
FIG. 7 is a view which shows a procedure of a mirror adjustment action.

Further, when the laser oscillator 2 includes the folding mirrors 23, 24, the slants of these folding mirrors 23, 24 initially are off from the ideal values. Therefore, for example, sometimes the approximation curves which are obtained at step S51 etc. of FIG. 7 are not symmetric at the left and right.

Further, if repeatedly performing the processing of step S52 to step S58, the deviations in slants of the inside mirrors 21 to 24 are gradually corrected and the approximation curves which are obtained at step S58 become generally symmetric at the left and right. In other words, in the present invention, by repeating the adjustment processing which is shown in the steps of FIG. 7, the slants of all of the inside mirrors 21 to 24 are corrected and the optical axis of the laser can be more accurately adjusted.

Figure 11:
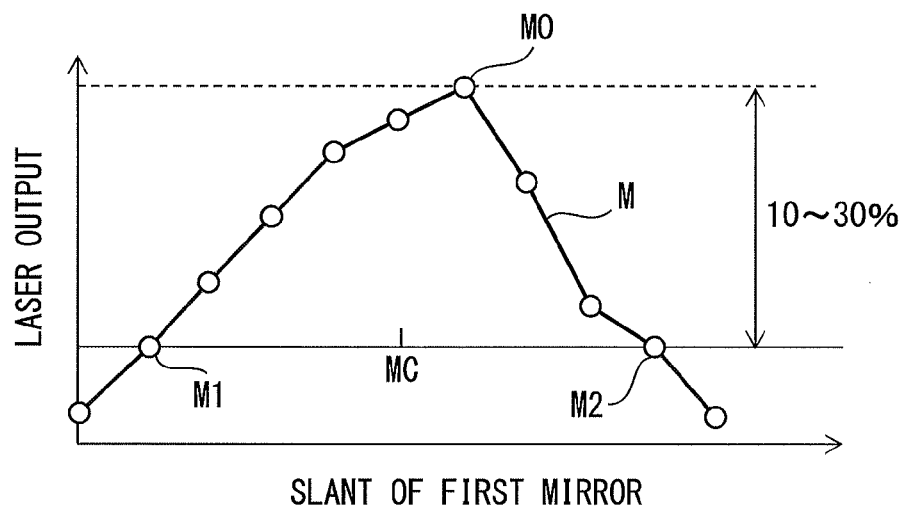
FIG. 11 is a view which shows the relationship between a slant of a first mirror among two mirrors and a laser output in the prior art.
Figure 12:
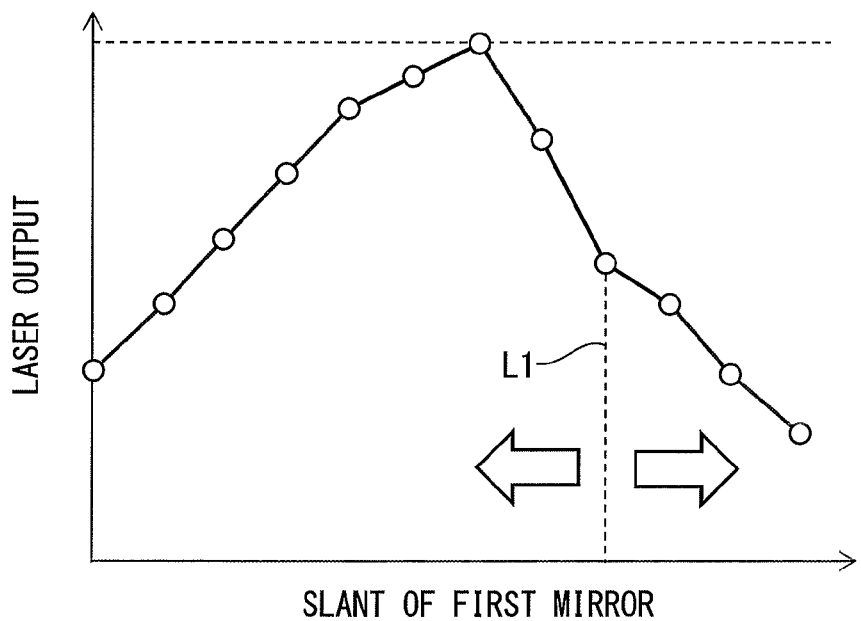
FIG. 12 is another view which shows the relationship between a slant of a first mirror and a laser output in the prior art.

In this way, in the present invention, the first set to third set of data are used to calculate the first approximation curve E1 of the laser output for the slant of the first mirror 21 and the second approximation curve E2 of the laser output for the slant of the second mirror 22, the value AF which corresponds to the local maximum value F1 of the first approximation curve E1 is set for the slant of the first mirror 21, and the value BF which corresponds to the local maximum value F2 of the second approximation curve E2 is set for the slant of the second mirror 22. In other words, in the present invention, the optimum values of the slants of the first mirror 21 and the second mirror 22 can be found by three adjustment operations. As will be understood by referring to FIG. 11, in the past, usually five or more adjustment operations were required, but it is learned that in the present invention, the work time can be greatly shortened.

Furthermore, four or more sets of data may also be used to calculate the approximation curve.

Figure 8:
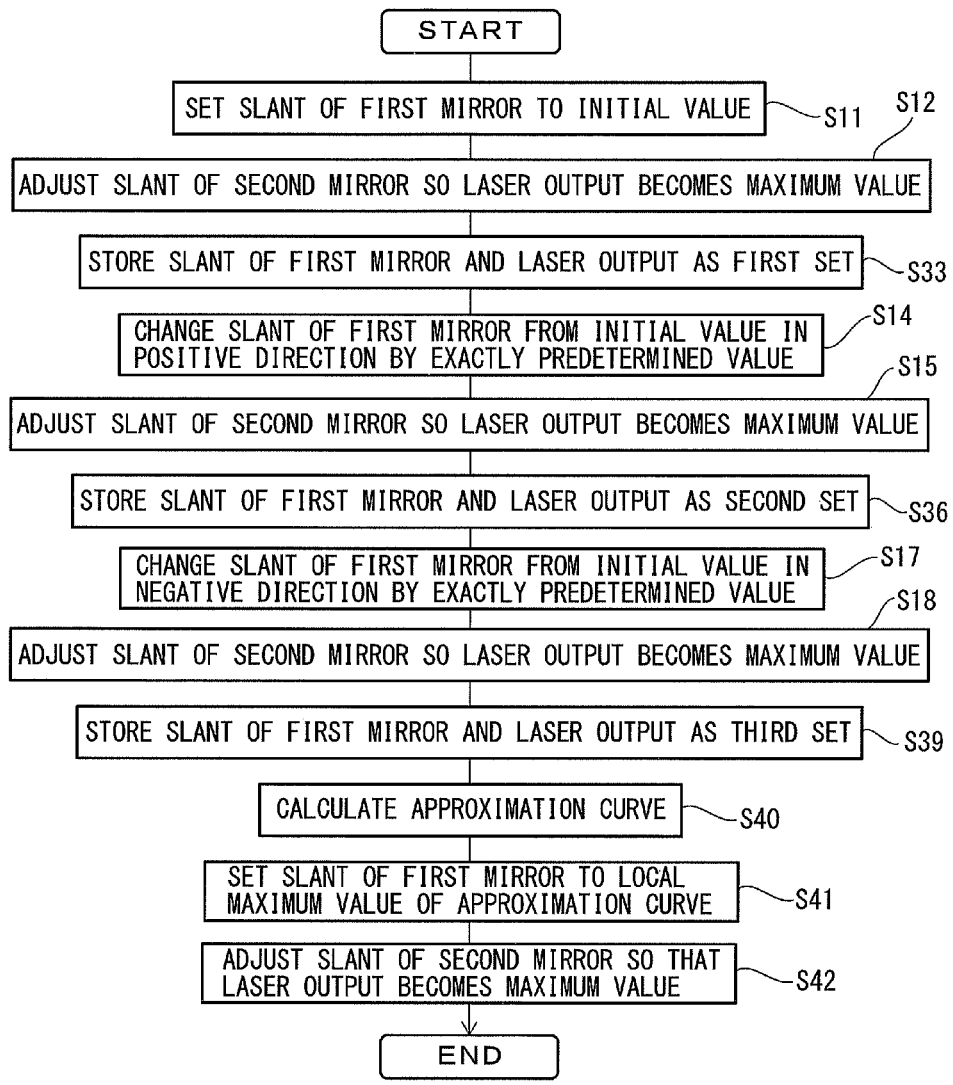
FIG. 8 is a flow chart which explains a mirror adjustment method according to a second embodiment of the present invention.
Figure 9A:
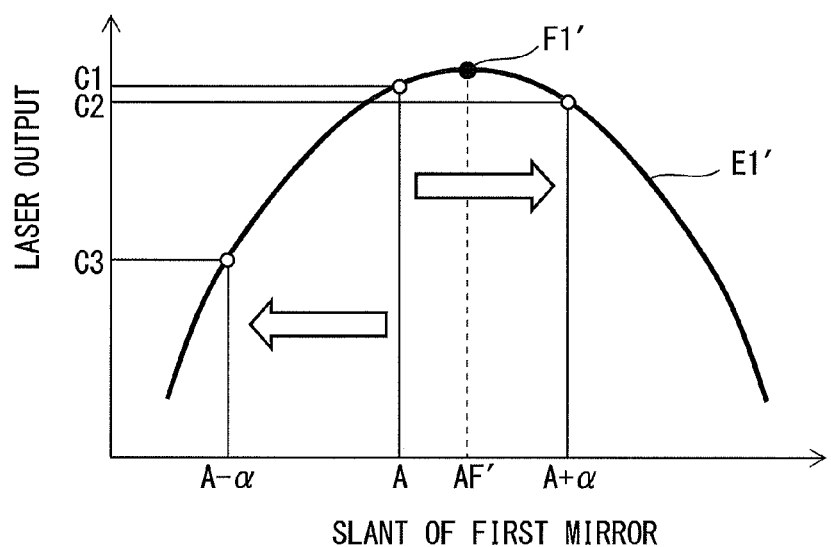
FIG. 9A is another view which shows the relationship between a slant of a first mirror and a laser output.
Figure 9B:
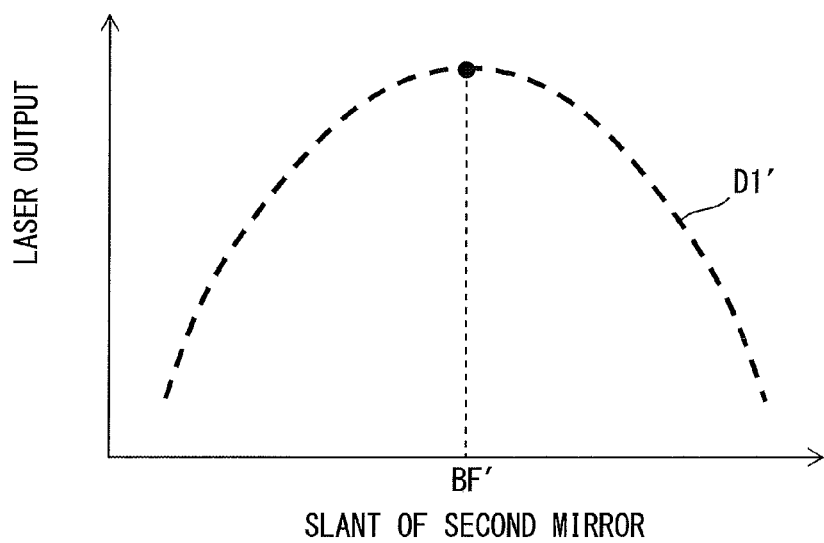
FIG. 9B is another view which shows the relationship between a slant of a second mirror and a laser output.

FIG. 8 is a flow chart which explains the mirror adjustment method according to a second embodiment of the present invention. Further, FIG. 9A is another view which shows the relationship of the slant of the first mirror and the laser output, while FIG. 9B is another view which shows the relationship of the slant of the second mirror and the laser output. Below, referring to these figures, a mirror adjustment method according to the second embodiment of the present invention will be explained. Note that, step S11, step S12, step S14, step S15, step S17, and step S18 in FIG. 8 are similar to those explained above with reference to FIG. 4, so repeat explanations will be omitted.

At step S33 in FIG. 8, only the slant A of the first mirror 21 and the maximum value C1 of the laser output are stored as a first set linked together in the memory part 31 of the control device 3. Further, in the same way at step S36 and step S39, only the slants A+α and A−α of the first mirror 21 and the maximum values C2, C3 of the laser output are stored as the second set and third set in the memory part 31, respectively.

Then, at step S40, the calculating part 32 of the control device 3 uses the first set to the third set of data to calculate the approximation curve E1' of the laser output with respect to the slant of the first mirror 21 (see FIG. 9A). Further, in the same way as explained above, the value AF' which corresponds to the local maximum value F1' of the approximation curve E1' is set as the slant of the first mirror 21.

Then, at step S42, as shown by the broken line D1' in FIG. 9B, the first adjusting part 52 of the stage 42 is used to adjust the slant of the second mirror 22. Further, the slant BF' of the second mirror 22 is set so that the laser output which is measured by the laser power sensor 25 becomes the maximum value (see FIG. 9B). After that, as explained with reference to FIG. 6 and FIG. 7, the other directions and other inside mirrors are similarly adjusted.

In this way, in the second embodiment of the present invention, the first set to third set of data are used to calculate the approximation curve E1' of the laser output with respect to the slant of the first mirror 21, the value AF' which corresponds to the local maximum value F1' of the first approximation curve E1' is set for the slant of the first mirror 21, and, in that state, the slant of the second mirror 22 is adjusted so that the laser output becomes the maximum value. In the second embodiment, by just calculating the approximation curve E1' of the laser output with respect the slant of the first mirror 21, it is possible to adjust the slant of the first mirror 21 and the slant of the second mirror 22. Therefore, in the same way as the above-mentioned first embodiment, the work time which is required for adjustment can be greatly shortened. Note that, in the second embodiment, it is not necessary to read a value relating to the slant of the second mirror, so the adjusting part of the second mirror may be kept simple in configuration.

Further, in the first and the second embodiments, when performing the adjustment action in the same direction on two inside mirrors two times or more, it is also possible to use the data of the last performed adjustment action of the first adjustment action, for example, the third set, as the initial value of the second adjustment action. In such a case, it will be understood that it is possible to shorten the work time as a whole compared with the case of performing the second adjustment action from the start.

Figure 10:
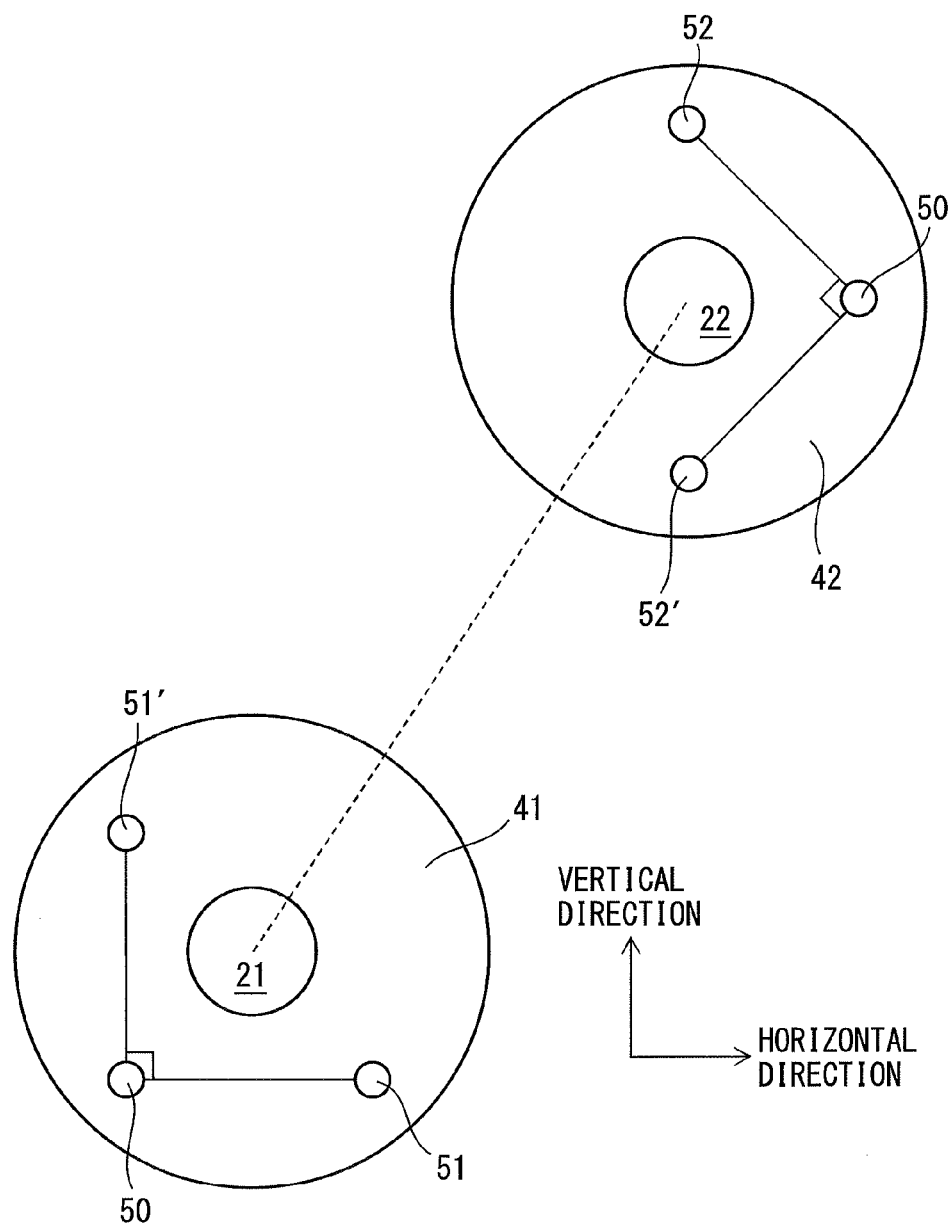
FIG. 10 is a top view of two stages.

Furthermore, FIG. 10 is a top view of two stages. FIG. 10 shows the stage 41 of the first mirror 21 and the stage 42 of the second mirror 22. In FIG. 10, at the stage 41, the line segment which connects the support point 50 and the first adjusting part 51 is in the horizontal direction, while the line segment which connects the support point 50 and the second adjusting part 51' is in the vertical direction. As opposed to this, the line segment which connects the support point 50 and the first adjusting part 52 and the line segment which connects it with the second adjusting part 52' at the stage 42 adjusting part 52 may both be in the horizontal direction or in the vertical direction.

In the configuration which is shown in FIG. 10, for example, consider the case of adjusting the first mirror 21 (rear mirror) and the second mirror 22 (output coupler) in the X-axial direction (horizontal direction). In this case, for the first mirror 21, it is sufficient to adjust just the first adjusting part 51. As opposed to this, when adjusting the second mirror 22 in the X-axial direction, both the first adjusting part 52 and second adjusting part 52' have to be adjusted. The same is true when adjusting the second mirror 22 in the Y-axial direction. Therefore, it will be understood that even if the first mirror 21 and the second mirror 22 are off from each other in orientation, the slants of the first mirror 21 and the second mirror 22 can be adjusted.

Therefore, it is clear that approximation curves for the first mirror 21 and second mirror 22 can be obtained. Further, in the present configuration, part of the control device 3 may be replaced with a mobile type computer or a computer with a display function and the operator may store, enter, and adjust data by the same.

Advantageous Effects of Invention

In the first and fifth aspects, the slant of the first mirror, the slant of a second mirror, and the laser output when the slant of the first mirror is an initial value and when the slant of the first mirror is made to move from the initial value by exactly a predetermined value in the positive and negative directions are used as the basis to calculate a first approximation curve of the laser output with respect to the slant of the first mirror and second approximation curve of the laser output with respect to the slant of the second mirror, set a value which corresponds to a local maximum value of the first approximation curve as the slant of the first mirror, and set a value which corresponds to a local maximum value of the second approximation curve as the slant of the second mirror. For this reason, it is possible to reduce the number of operations for adjustment, which used to require five or more operations, to three and as a result possible to shorten the work time.

In the second and sixth aspects, it is possible to easily calculate the local maximum value from the first set to third set of data by approximation by secondary functions.

In the third and seventh aspects, the slant of the first mirror and the laser output when the slant of the first mirror is an initial value and when the slant of the first mirror is made to move from the initial value by exactly a predetermined value in the positive and negative directions are used as the basis to calculate a first approximation curve of the laser output with respect to the slant of the first mirror, set a value which corresponds to a local maximum value of the approximation curve as the slant of the first mirror, then set the slant of the second mirror so that the laser output becomes a maximum value. By just calculating the approximation curve of the laser output with respect to the slant of the first mirror, it is possible to adjust the slant of the first mirror and the slant of the second mirror. Therefore, it is possible to shorten the work time which is required for adjustment. Further, in this case, it is not necessary to read a value relating to the slant of the second mirror, so the adjusting part of the second mirror may be simply configured.

In the fourth and eighth aspects, it is possible to easily calculate the local maximum value from the first set to third set of data by approximation by secondary functions.

In the ninth aspect, adjustment is performed by the first aspect, so maintenance of the laser oscillator can be performed in a short time.

In the 10th aspect, adjustment is performed by the third aspect, so maintenance of the laser oscillator can be performed in a short time.

In the 11th aspect, the mirror adjusting system of the seventh aspect is provided, so maintenance of the laser oscillator can be performed in a short time.

In the 12th aspect, the mirror adjusting system of the seventh aspect is provided, so maintenance of the laser oscillator can be performed in a short time.

Typical embodiments were used to explain the present invention, but a person skilled in the art would understand that the above-mentioned changes and various other changes, deletions, and additions may be made without departing from the scope of the present invention.

The invention claimed is:

1. A mirror adjustment method which adjusts slants of a first mirror and second mirror in a mirror adjusting system, comprising:
    a laser oscillator which includes at least said first mirror and said second mirror,
    a laser output measuring part which measures a laser output from said laser oscillator,
    a first adjusting part which adjusts the slant of said first mirror, and
    a second adjusting part which adjusts the slant of said second mirror, which mirror adjustment method comprising steps of:
    in a state where said first adjusting part sets the slant of said first mirror to an initial value, storing a slant of said second mirror which is adjusted by said second adjusting part so that a laser output which is measured by said laser output measuring part becomes a maximum value, the slant of said first mirror, and said maximum value of said laser output as a first set,
    in a state where said first adjusting part changes the slant of said first mirror from the initial value in a positive direction by exactly a predetermined value, storing the slant of said second mirror which is adjusted by said second adjusting part so that said laser output which is measured by said laser output measuring part becomes a maximum value, the slant of said first mirror, and said maximum value of said laser output as a second set,
    in a state where said first adjusting part changes the slant of said first mirror from the initial value in a negative direction by exactly a predetermined value, storing the slant of said second mirror which is adjusted by said second adjusting part so that said laser output which is measured by said laser output measuring part becomes a maximum value, the slant of said first mirror, and said maximum value of said laser output as a third set,
    calculating a first approximation curve of said laser output with respect to the slant of said first mirror and a second approximation curve of said laser output with respect to the slant of said second mirror, based on said first set, said second set, and said third set,
    setting the slant of said first mirror to a value which corresponds to a local maximum value of said first approximation curve, by said first adjusting part, and
    setting the slant of said second mirror to a value which corresponds to a local maximum value of said second approximation curve, by said second adjusting part.

2. The mirror adjustment method according to claim 1, wherein said first approximation curve and said second approximation curve are secondary functions.

3. A mirror adjustment method which adjusts slants of a first mirror and second mirror in a mirror adjusting system, comprising:
    a laser oscillator which includes at least said first mirror and said second mirror,
    a laser output measuring part which measures a laser output from said laser oscillator,
    a first adjusting part which adjusts the slant of said first mirror, and
    a second adjusting part which adjusts the slant of said second mirror, which mirror adjustment method comprising steps of:
    in a state where said first adjusting part sets the slant of said first mirror to an initial value, storing a slant of said first at the time when said second adjusting part adjusts a slant of said second mirror so that a laser output which is measured by said laser output measuring part becomes a maximum value and said maximum value of said laser output as a first set,
    in a state where said first adjusting part changes the slant of said first mirror from the initial value in a positive direction by exactly a predetermined value, storing the slant of said first mirror at the time when said second adjusting part adjusts a slant of said second mirror so that a laser output which is measured by said laser output measuring part becomes a maximum value and said maximum value of said laser output as a second set,
    in a state where said first adjusting part changes the slant of said first mirror from the initial value in a negative direction by exactly a predetermined value, storing the slant of said first mirror at the time when said second adjusting part adjusts a slant of said second mirror so that a laser output which is measured by said laser output measuring part becomes a maximum value and said maximum value of said laser output as a third set,
    calculating an approximation curve of said laser output with respect to the slant of said first mirror, based on said first set, said second set, and said third set, setting the slant of said first mirror to a value which corresponds to a local maximum value of said first approximation curve, by said first adjusting part, and adjusting a slant of said second mirror so that a laser output which is measured by said laser output measuring part becomes a maximum value, by said second adjusting part.

4. The mirror adjustment method according to claim 3, wherein said approximation curve is a secondary function.

5. A mirror adjusting system, comprising:
a laser oscillator which includes at least a first mirror and a second mirror,
a laser output measuring part which measures a laser output from said laser oscillator,
a first adjusting part which adjusts the slant of said first mirror,
a second adjusting part which adjusts the slant of said second mirror, and
a memory part which stores said laser output which was measured by said laser output measuring part, a slant of said first mirror which was adjusted by said first adjusting part, and a slant of said second mirror which was adjusted by said second adjusting part linked together,
wherein, in a state where said first adjusting part sets the slant of said first mirror to an initial value, said memory part stores a slant of said second mirror which is adjusted by said second adjusting part so that a laser output which is measured by said laser output measuring part becomes a maximum value, the slant of said first mirror, and said maximum value of said laser output as a first set,
wherein, in a state where said first adjusting part changes the slant of said first mirror from the initial value in a positive direction by exactly a predetermined value, said memory part stores the slant of said second mirror which is adjusted by said second adjusting part so that said laser output which is measured by said laser output measuring part becomes a maximum value, the slant of said first mirror, and said maximum value of said laser output as a second set,
wherein, in a state where said first adjusting part changes the slant of said first mirror from the initial value in a negative direction by exactly a predetermined value, said memory part stores the slant of said second mirror which is adjusted by said second adjusting part so that said laser output which is measured by said laser output measuring part becomes a maximum value, the slant of said first mirror, and said maximum value of said laser output as a third set,
the mirror adjusting system further comprising:
a calculating part which calculates a first approximation curve of said laser output with respect to the slant of said first mirror and a second approximation curve of said laser output with respect to the slant of said second mirror, based on said first set, said second set, and said third set, and
wherein said first adjusting part sets the slant of said first mirror to a value which corresponds to a local maximum value of said first approximation curve, and said second adjusting part sets the slant of said second mirror to a value which corresponds to a local maximum value of said second approximation curve.

6. The mirror adjusting system according to claim 5, wherein said first approximation curve and said second approximation curve are secondary functions.

7. A mirror adjusting system, comprising:
a laser oscillator which includes at least a first mirror and a second mirror,
a laser output measuring part which measures a laser output from said laser oscillator,
a first adjusting part which adjusts the slant of said first mirror,
a second adjusting part which adjusts the slant of said second mirror, and
a memory part which stores said laser output which was measured by said laser output measuring part, a slant of said first mirror which was adjusted by said first adjusting part, and a slant of said second mirror which was adjusted by said second adjusting part linked together,
wherein, in a state where said first adjusting part sets the slant of said first mirror to an initial value, said memory part stores a slant of said first at the time when said second adjusting part adjusts a slant of said second mirror so that a laser output which is measured by said laser output measuring part becomes a maximum value and said maximum value of said laser output as a first set,
wherein, in a state where said first adjusting part changes the slant of said first mirror from the initial value in a positive direction by exactly a predetermined value, said memory part stores the slant of said first mirror at the time when said second adjusting part adjusts a slant of said second mirror so that a laser output which is measured by said laser output measuring part becomes a maximum value and said maximum value of said laser output as a second set,
wherein, in a state where said first adjusting part changes the slant of said first mirror from the initial value in a negative direction by exactly a predetermined value, said memory part stores the slant of said first mirror at the time when said second adjusting part adjusts a slant of said second mirror so that a laser output which is measured by said laser output measuring part becomes a maximum value and said maximum value of said laser output as a third set,
the mirror adjusting system further comprising:
a calculating part which calculates a first approximation curve of said laser output with respect to the slant of said first mirror, based on said first set, said second set, and said third set, and
wherein said first adjusting part sets the slant of said first mirror to a value which corresponds to a local maximum value of said first approximation curve, and said second adjusting part sets the slant of said second mirror to a value which corresponds to a local maximum value of said second approximation curve.

8. The mirror adjusting system according to claim 7 wherein said approximation curve is a secondary function.

9. A laser oscillator which is adjusted in slants of said first mirror and said second mirror by the mirror adjustment method according to claim 1.

10. A laser oscillator which is adjusted in slants of said first mirror and said second mirror by the mirror adjustment method according to claim 3.

11. A laser oscillator which is provided with a mirror adjusting system according to claim 5.

12. A laser oscillator which is provided with a mirror adjusting system according to claim 7.

* * * * *